United States Patent [19]

Bucknam

[11] 4,399,368

[45] Aug. 16, 1983

[54] POWER PLANT AND PROCESS UTILIZING GRAVITATIONAL FORCE

[76] Inventor: Donald C. Bucknam, 2124 S. 110th St., Omaha, Douglas County, Nebr. 68144

[21] Appl. No.: 358,225

[22] Filed: Mar. 15, 1982

Related U.S. Application Data

[63] Continuation-in-part of Ser. No. 197,314, Oct. 15, 1980.

[51] Int. Cl.³ ............................................. F03G 7/02
[52] U.S. Cl. .................................. 290/1 R; 60/641.8; 60/721; 60/910
[58] Field of Search ........... 123/46 R, 46 E, DIG. 12; 60/721, DIG. 1, 341.8, 341.11, 341.15; 290/1 R; 310/15, 23

[56] References Cited

U.S. PATENT DOCUMENTS

| | | | |
|---|---|---|---|
| 1,544,010 | 6/1925 | Jordan | 123/46 E |
| 2,362,151 | 11/1944 | Ostenberg | 290/1 R |
| 3,927,329 | 12/1975 | Fawcett et al. | 290/1 R |
| 4,342,920 | 8/1982 | Bucknam | 123/46 E |

*Primary Examiner*—J. V. Truhe
*Assistant Examiner*—Shelley Wade
*Attorney, Agent, or Firm*—Henderson & Sturm

[57] ABSTRACT

A power plant and process for converting gas expanding and contracting energy sources into useful forms of energy and utilizing gravitational force, wherein a piston containing a magnet and able to fall within an enclosed cylinder, having a non-magnetically-responsive center portion surrounded by an induction coil is repeatedly impelled upwards thereby inducing an alternating electric current in the coil. In the first alternate embodiment, concentrated solar energy is directed onto a liquid in the bottom of the cylinder to provide an expanding gas beneath the piston. As the piston moves upwards within the cylinder, compressed air is pumped into a reservoir, after which it is available to serve as a source of stored energy. A rotary diversion valve directs hot vapor and liquid first, between a separate vapor and water reservoir and the cylinder, in order to provide vapor for a bounce chamber beneath the piston and then, to a remote cooled condenser, in order that the vapor may be condensed apart from the cylinder as the piston is free falling. The second alternate embodiment varies from the first in that liquid is vaporized above the piston in order to compress air or pump water below it. The third alternate embodiment utilizes steam and vacuum to impel a piston both up and down and has no compressed air reservoir.

31 Claims, 6 Drawing Figures

POWER PLANT AND PROCESS UTILIZING GRAVITATIONAL FORCE

BACKGROUND OF THE INVENTION

This application is a continuation-in-part of application Ser. No. 197,314, filed Oct. 15, 1980.

This invention relates generally to power plants and processes for converting energy from fuel or other sources for expanding or contracting gases into useful forms of energy which incorporate enclosed expansion chambers, wherein gases expand or contract anterior to a piston slidably operable within a cylinder and more particularly to such processes and devices which do not require mechanical means of transferring the energy from the piston or a structure such as a flywheel to serve as a reservoir of potential and kinetic energy.

Conventional internal (gas) or external (steam) combustion engines have long been employed to convert fuel energy into various forms of stored energy or to operate moving apparatus. Such devices have traditionally employed mechanical means of transferring the energy such as connecting rods, cranks, and crankshafts. Also, they generally require a flywheel of greater or lesser affect depending upon various factors, such as the number of pistons, the massiveness of engine parts, and the requirements for smooth and constant flow of energy. In addition, other conventional parts are required, such as piston pin bearings, all needing lubricating means. Also, the momentum acquired by the piston must be cancelled by the crank at the end of every stroke.

If the conventional device employs internal combustion, either a crankcase or turbine is required. If it uses external combustion, a burner, boiler, turbine and smokestacks are needed, all of the latter are dispensed with in the present invention. To meet demands for strength and stress, such auxiliary parts require additional materials, all of which reduce the ratio of energy available to perform work to the fuel consumed. Correspondingly, downtime for maintenance and repairs is reduced by the present invention. Furthermore, the present invention is not subject to the size limitations governed by the strength and stress withstanding properties of available materials required by large scale power plants designed to produce great quantities of energy.

SUMMARY OF THE INVENTION

A piston containing a magnet is repeatedly impelled upwards within an enclosed cylinder having a load-connected electrical conductor coil surrounding its center portion. The first alternate embodiment utilizes concentrated solar energy as a source of heat energy by directing it through a transparent structure in the upper end of the cylinder and a transparent core in the piston onto a black colored liquid in its lower end so that the liquid will vaporize. As the piston reaches the apex position a three-way rotary diversion valve directs the hot vapor to a separate hot vapor reservoir, partially filled with the liquid, in order to trap a portion of the vapor for later use as a gas in a bounce chamber beneath the piston. The rotary valve then directs remaining hot vapor from the cylinder to a remote cooled liquid condenser included to enhance the speed with which the liquid vapor is condensed, and thus the speed with which the piston is returned, and to replenish the liquid in the separate reservoir. In addition, a compressed air reservoir is included for the provision of an additional source of energy in the form of compressed air produced by the upward motion of the piston in the cylinder, said compressed air also being available to pneumatically power the rotary valve.

The second alternate embodiment varies from the first in that liquid is vaporized above a piston to compress air or pump water below it. The piston is lifted by the effect of a vacuum above it created by a remote liquid condenser. The third alternate embodiment alternately utilizes steam on one side of a piston and a vacuum on the other for both lifting and lowering the piston. No compressed air is produced.

An object of the present invention is to provide a process for converting energy into useful forms without employing expensive, heavy and dangerous moving parts, such as connecting rods, cranks, crankshafts, and flywheels.

Another object of the invention is the economic conversion of solar energy into electrical energy regardless of the size of the device.

Still another object of the invention is to convert waste industrial steam and geothermal steam into electrical energy.

A further object of the invention is to circumvent the limits imposed by mass, intertia, momentum, wear, maintenance, and manufacturability of the parts.

A still further object of the invention is to convert solar energy into compressed air or to pump water to higher elevations for use as a supplemental source of stored energy.

Still further additional objects are to eliminate in power plants costly and massive parts, reduce the consumption of fuel, and reduce pollution.

Yet another object is to provide a simpler power plant, less expensive to build and operating solely on solar based energy.

Yet a further object of the invention is to utilize space occupied by the secondary parts of a conventional engine for the principle parts of the electrical energy generating parts of the present invention.

Other objects, advantages and novel features of the present invention will become apparent from the following detailed description of the invention when considered in conjunction with the accompanying drawings.

DESCRIPTION OF THE FIRST ALTERNATE EMBODIMENT

Figure 1:
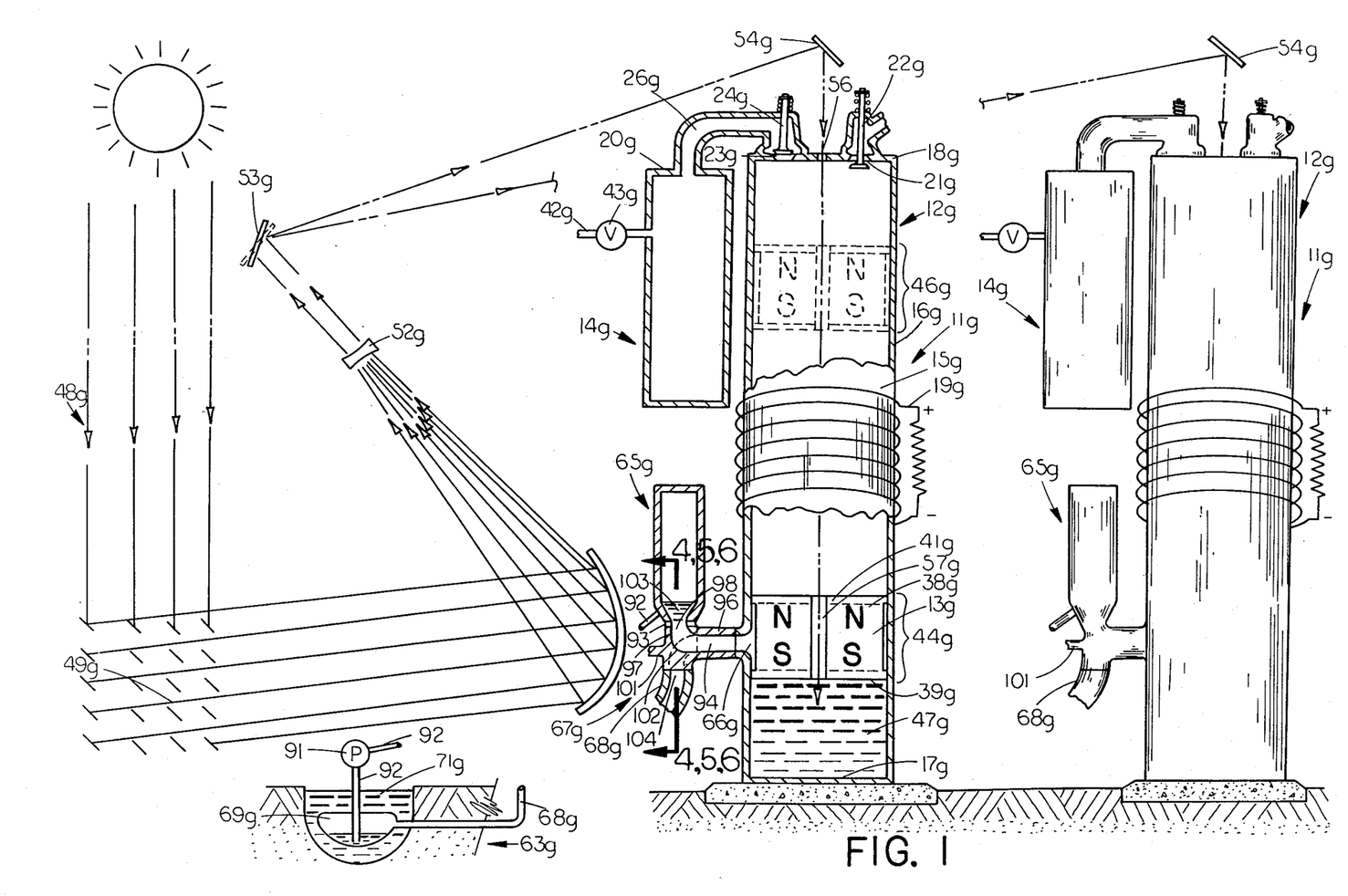
FIG. 1 is a diagramatic, fragmented, cross-sectional side view of the first alternate embodiment wherein a structure for vaporizing and expanding a liquid below a piston by concentrated solar energy, a remote cooled vapor condensor and a separate hot liquid and vapor reservoir are shown.

Referring now to the drawings wherein like reference numerals designate identical or corresponding parts, the power plant is depicted generally in FIG. 1 at $11g$ and includes a cylinder assembly $12g$, a piston assembly $13g$, an air reservoir $14g$, a liquid vapor condenser assembly $63g$, a separate hot vapor reservoir $65g$, a three-way rotary valve assembly $67g$, and a concentrated solar energy assembly $48g$.

The cylinder assembly $12g$ is comprised of a cylinder wall $16g$, and a load-connected electrical conductor coil $19g$ surrounding a center portion $15g$ of the cylinder. The center portion $15g$ of the cylinder $16g$ must be of a non-magnetically-responsive material of either metal or ceramic. By properly supporting the upper half of the cylinder, the walls of the central part of the cylinder $15g$ between the ends may be relatively thin, thus permitting the coil to be in close proximity with the magnetic piston. As compared to the center portion $15g$, a portion near the lower end wall $17g$, is subject to higher demands for structural strength, heat resistance, and pressure resistance. Materials with appropriate properties are well known and are required for the device to function properly.

The piston assembly $13g$ is slidably operable within the cylinder assembly $12g$ and includes an intermediate bar magnet in the form of a magnetic disc $38g$ which has a lower ceramic plate $39g$ and an upper ceramic plate $41g$ secured to its lower and upper ends, respectively, to serve as piston rings. The polar axis of the bar magnet $38g$ is oriented so that it coincides with the longitudinal axis of the cylinder assembly $12g$. The lower and upper plates $39g$ and $41g$, may be of other non-magnetically-responsive material such as copper or aluminum.

The upper end wall $18g$ of the cylinder assembly $12g$ has an inlet port $21g$ with a spring-biased valve $22g$ mounted therein and an outlet port $23g$ with a spring-biased valve $24g$ mounted therein which is connected by a tube $26g$ to first end $20g$ of air reservoir $14g$. Air reservoir $14g$ has a take-off tube $42g$ with check valve $43g$ mounted therein. As will be noted hereinafter, air reservoir $14g$ may be utilized as a supplementary source of stored energy by tapping compressed air through tube $42g$. In addition, storing and releasing energy in this manner further provides for fluctuations in load.

Figure 4:
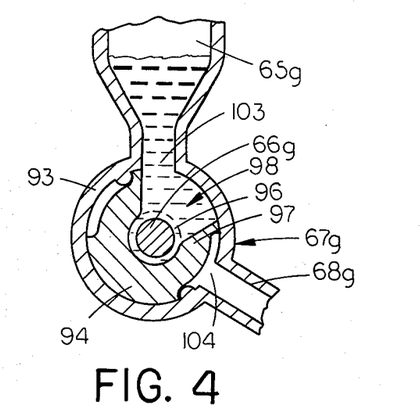
FIG. 4 is an enlarged cross-sectional partial view of the rotary valve in a position which allows flow between the cylinder and the separate hot vapor reservoir of the embodiment of FIGS. 1, 2 and 3, taken along line 4—4 of each of said FIGS.

Adjacent the lower end wall $17g$, located in cylinder wall $16g$ is inlet/outlet port $66g$ (See also FIG. 4) having a rotary diversion valve assembly $67g$ mounted therein and connected to separate hot vapor reservoir $65g$ and through tube $68g$ to separate condenser $69g$ of vapor condensing assembly $63g$. Vapor condensing assembly $63g$ includes separate condenser $69g$ which contains a near perfect vacuum, chilled water $71g$ which envelops condenser $69g$, and liquid pump $91$ which returns condensed vapor from separate condenser $69g$ through tube $92$ to separate vapor reservoir $65g$.

Figure 5:
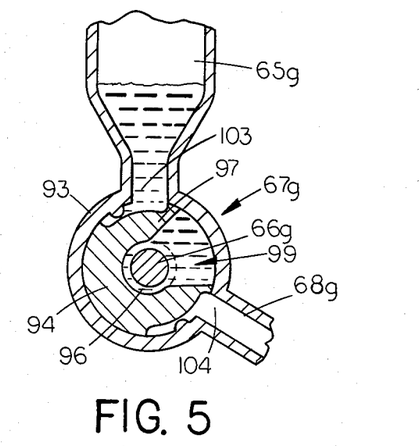
FIG. 5 is an enlarged cross-sectional partial view of the rotary valve in a position which allows no flow between the cylinder and the interconnected elements of the embodiments of FIGS. 1, 2 and 3, taken along line 5—5 of each of said FIGS.
Figure 6:
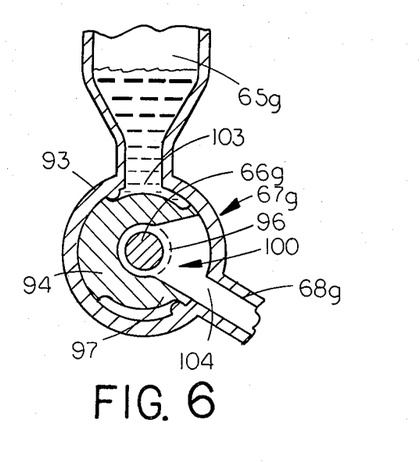
FIG. 6 is an enlarged cross-sectional partial view of the rotary valve in a position which allows flow between the cylinder and the remote vapor condenser of the embodiments of FIGS. 1, 2 and 3, taken along line 6—6 of each of said FIGS.

Rotary diversion valve assembly $67g$ is comprised of a housing $93$ which is a drum shaped hollow cylinder having two circular openings $103$ and $104$ (See FIG. 4), a rotatable elbow joint $94$ which rides inside of housing $93$ and has an internal conformation which permits one leg $96$ of the elbow to rotate in sealed conjoinment with port $66g$ (See FIG. 1) and the other leg $97$ to be moved rotationally between three positions. These positions can be most clearly understood by reference to FIGS. 4, 5 and 6 and include a first position $98$ where cylinder $12g$ is connected with vapor reservoir $65g$ through opening $103$ of housing $93$ (See FIGS. 1 and 4) and a second position $99$ where cylinder $12g$ is sealed with respect to reservoir $65g$ and condenser $69g$ (See FIG. 5) and a third position $100$ where cylinder $12g$ is connected by tube $68g$ to vapor condenser assembly $63g$ through opening $104$ of housing $93$ (see FIG. 6). The internal conformation of leg $97$ is such that the above relationships can be realized by an appropriate rotation of elbow joint valve $94$. A shaft $101$ is affixed to an exposed portion $102$ of elbow joint $94$ located opposite its conjoinment with port $66g$ for rotation thereof by conventional structure (See FIG. 1). As the present invention is operated, compressed air is accumulated in compressed air reservoir $14g$ in a manner to be disclosed hereinafter, and said compressed air supply may be used to supply pneumatic power to pistons to operate cranks (not shown) for turning shaft $101$.

Cylinder assembly $12g$ has a black colored liquid $47g$ contained beneath a piston assembly starting position $44g$ and adjacent its lower end wall $17g$. Concentrated solar energy assembly $48g$ for vaporizing the black colored liquid $47g$ includes conventional heliostat reflectors $49g$, parobolic concentrator-reflector $51g$, concave lens $52g$, movable reflector $53g$, stationary reflector $54g$, solid transparent portion $56g$ of upper end wall $18g$, and solid transparent core portion $57g$ of the piston assembly $13g$.

Additional complexes of cylinder assembly $12g$, piston assembly $13g$, and air reservoir $14g$ may be synchronized with a single solar energy assembly $48g$ so as to produce a more constant supply of converted energy and to maximize the use of sunlight. Although an air reservoir $14g$ is shown for each power plant complex, a single air reservoir could serve several such complexes. Likewise, individual vapor condensing assemblies $63g$ could be provided for each power plant complex, rather than a single one to serve several such complexes as shown.

The process of converting energy with the power plant $11g$ includes a starting phase and a repeating cycle phase. Prior to initiating the starting phase, the piston assembly $13g$ is held at rest at starting position $44g$ by the compressive support of liquid $47g$. The starting phase is initiated by the vaporization of liquid $47g$ when concentrated solar energy is directed upon it. The black colored liquid $47g$ is thereby vaporized forming an expanding gas which lifts the piston assembly $13g$ to apex position $46g$ near upper end wall $18g$. During this operation, the column of air above piston assembly $13g$ passes through outlet port $23g$ and tube $26g$ into air reservoir $14g$ creating a supply of compressed air therein. After vapor expanding beneath piston assembly $13g$ has lifted it to apex position $46g$, in the case where a single power plant complex is synchronized with one or more others, movable reflector $53g$ of solar energy means $48g$ directs concentrated solar energy to another stationary reflector 54g of another complex, allowing piston assembly 13g to free fall as black colored liquid 47g thereafter begins to cool and condense. Otherwise, the position of movable reflector 53g of solar energy means 48g would be shifted at appropriate points in time so as to discontinue any unneeded vaporization of liquid 47g or for the purpose of lifting piston assembly 13g to apex position 46g.

As piston assembly 13g free falls toward starting position 44g, it will pull open valve 22g permitting fresh air to enter through inlet port 21g and allow valve 24g to close, sealing off the supply of compressed air now in air reservoir 14g. In order to hasten the return of piston assembly 13g to starting position 44g, and due to the length of time it would take for the vaporized liquid in cylinder 12g to condense therein, the heated liquid vapor is released through port 66g prior to the initiation of the descent of piston assembly 13g.

This result is accomplished by valve assembly 67g, which opens to first position 98 to permit a certain amount of vapor to escape from the bottom of cylinder assembly 12g into the separate hot vapor reservoir 65g. This occurs before the piston reaches its apex position 46g while the vapor still contains considerable pressure. The amount of vapor permitted to escape into reservoir 65g is based on its future use as a medium for a bounce chamber beneath starting position 44g. After this quantity of vapor has been stored in reservoir 65g, valve assembly 67g moves to the third position 100 where the remaining vapor is permitted to escape through tube 68g into the cooled remote condenser 69g which always contains a near perfect vaccum. Thus, a vacuum beneath the piston is provided for a longer period of time, thereby assisting gravity in returning the piston to its starting position 44g.

When piston assembly 13g has reached a position about mid-way down the cylinder, valve assembly 67g returns to the first position 98, allowing the vapor and liquid to return from separate hot reservoir 65g to cylinder assembly 12g beneath piston assembly 13g in order to serve as a bounce medium for piston assembly 13g as it approaches starting position 44g. Also in this manner an adequate amount of dark colored liquid is returned to the cylinder 12g for the repeat cycle.

Prior to piston assembly 13g returning to starting position 44g, and as the black colored liquid 47g remaining in cylinder assembly 12g has begun to condense and mix with returning black colored liquid 47g from separate vapor reservoir 65g, concentrated solar energy means 48g is re-directed to the stationary reflector 54g in order that the black colored liquid reaccumulating in the bottom of cylinder assembly 12g is maintained at whatever temperature above its boiling point is desired with respect to operational requirements.

Before piston assembly 13g has reached its starting position 44g, rotary diversion valve assembly is moved to the second position 99, thus sealing off the cylinder beneath piston assembly 13g and the first repeating phase is initiated by the revaporization of the black colored liquid 47g. The temperature of the black colored liquid 47g is that of the surrounding environment only just prior to the starting phase and is higher during any repeating phase. Thus, the velocity of the ascending piston may be varied by controlling the operating temperature of the black colored liquid 47g.

There must be enough vapor from reservoir 65g above the water in the cylinder to provide a bounce chamber at the bottom of the cylinder which will deter the falling piston from ever physically striking the liquid. Were the piston to suddenly free fall against the liquid upon the setting of the sun or sudden moving in of cloud cover, the shock would undoubtedly do great damage to the cylinder unless other cushioning steps were taken. It is important that cylinder assembly 12g be well insulated, in particular in the area near lower end wall 17g, in order to keep it hot at all times for the purpose of avoiding the condensation of the hot vapor into black colored liquid which would occur if it were to come in contact with a cold cylinder wall. The more of the condensation which occurs in the separate condenser 69g, the more of the sun's energy will be converted into forms which can be stored and used.

It is also possible to direct the solar beam into the bounce chamber at a point prior to when piston assembly 13g has returned to starting position 44g there by increasing the pressure of the hot vapor in the bounce chamber to provide greater protection against the piston assembly 13g striking the liquid 47g.

Each time the piston assembly 13g begins its ascent in a repeating cycle condensed vapor from remote condenser 69g is pumped by pump 91 through tube 92 into the bottom of the vapor reservoir 65g and allowed to accumulate there until the piston assembly again reaches apex position 46g. To insure that the condensed vapor being pumped from remote condenser 69g does not enter reservoir 65g at a temperature which will reduce the vapor pressure in reservoir 65g, tube 92 passes through a thermostatically controlled heat exchange structure (not shown).

Compressed air reservoir 14g makes available an additional supply of high pressure gas which, in an emergency, could be piped to a safety valve beneath starting position 44g to bolster the bounce chamber medium (structure is not shown).

To discontinue the operation of the power plant when desired, as well as toward the end of each day, valve assembly 65g is prohibited from moving from first position 98 or second position 99 to the third position 100 thus preventing vapor from escaping to the remote condenser assembly 63g. As the vapor now trapped below piston assembly 13g loses its heat through cylinder wall 16g, the piston will gradually settle upon the liquid to be ready for the next starting phase.

It is believed that the method for producing and directing a beam of concentrated solar energy may not be generally known to those skilled in the pertinent art and, therefore, the following explanation is included herein. Sunlight is reflected by heliostat 49g, which is comprised of a large array of steered mirrors. As the sun moves across the sky, the heliostat 49g directs the beams to a parabolic concentrator-reflector 51g which is fixedly mounted and which directs the collection of beams through a concave lens 52g. The lens 52g causes the collection of beams to become a concentrated parallel beam and is located so as to direct this beam onto a movable mirror 53g. Mirror 53g is controlled by solenoid or hydraulic means to alternately direct the concentrated solar energy to the several stationary mirrors 54g where the beam is alternately reflected through transparent portion 56g of upper end wall 18g and transparent core portion 57g of piston assembly 13g onto the black colored liquid 47g in each cylinder assembly 12g.

In addition to the material requirements set forth hereinabove, the transparent portion 56g in upper end wall 18g and the transparent core 57g in piston assembly 13g may be of glass, crystal, or a suitable plastic which are well known in the art. A suitable agent for coloring the liquid 47g black is graphite containing some oil lubricant. Electronic timing devices (not shown) will maintain sequential control of the movable mirror 53g, and the timing of each step of the process is controlled by electronic timing devices through conventional switches operated by solenoids or by hydraulic, pneumatic or mechanical controls where necessary. Electronic timing devices which have provisions for adjustments to allow for variations in sunlight, atmospheric pressure, temperature, etc., are well known; and, under a given set of parameters, gravity being constant, once an appropriate timing sequence is determined, the energy converting device 11g will continue the repeating cycle.

Solar energy will be converted into electrical energy as the magnetic forces of the magnetic disc 38g pass by the electrical conductor coil 19g, thereby inducing an electric current. Means for converting the alternating current thus produced into suitable frequencies and voltages for transmission over long distances are well known and not shown herein. Also, stored energy is available in the form of compressed air by opening valve 43g mounted in take-off tube 42g.

DESCRIPTION OF THE SECOND ALTERNATE EMBODIMENT

Figure 2:
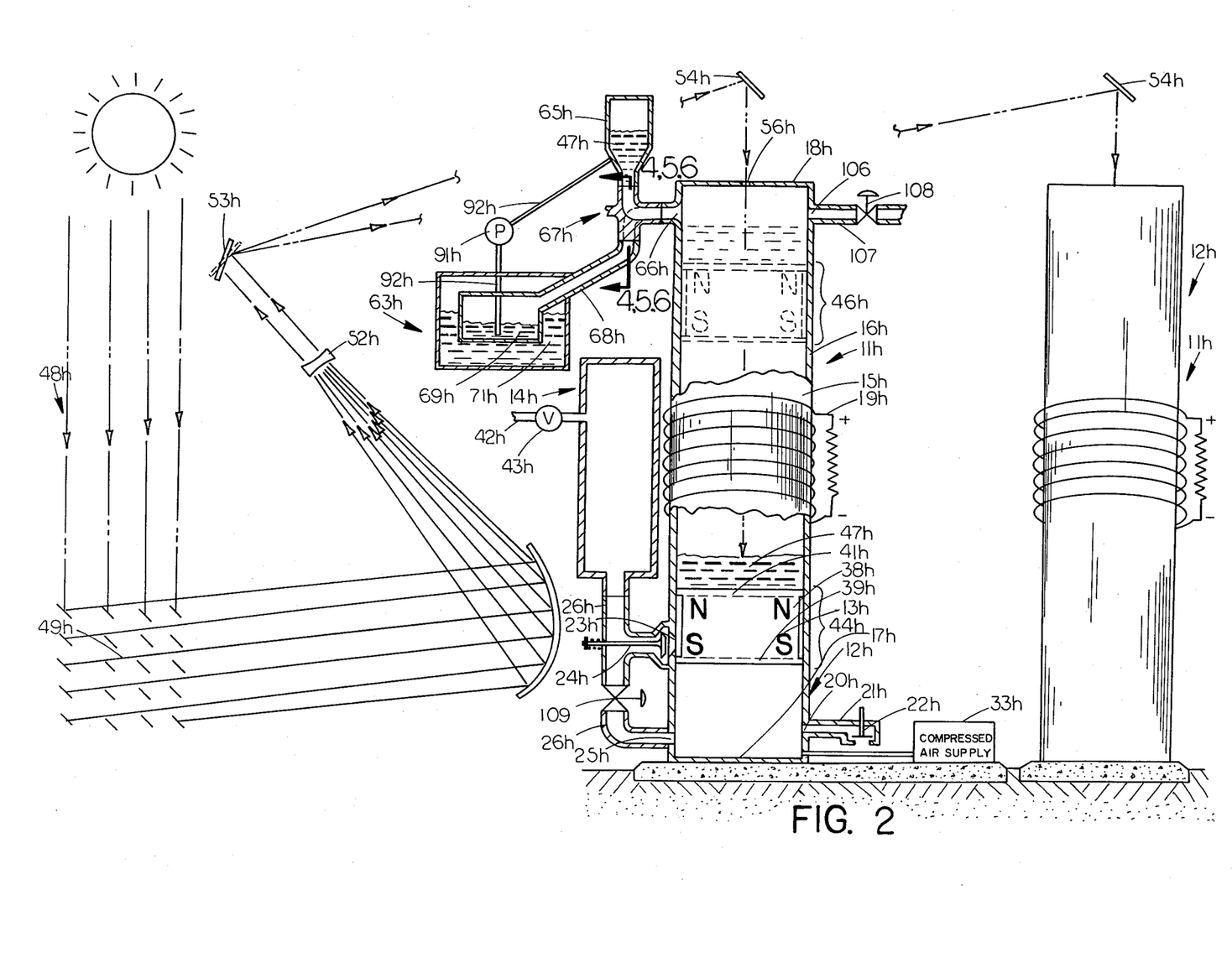
FIG. 2 is a diagramatic, fragmented, cross-sectional side view of the second alternate embodiment wherein a structure for vaporizing and expanding a liquid above a piston by concentrated solar energy, a remote cooled vapor condensor and a separate hot liquid and vapor reservoir are shown.

Referring now to FIG. 2, an alternate embodiment of the power plant is depicted generally as 11h and includes a cylinder assembly 12h, a piston assembly 13h, an air reservoir 14h, a steam condensing assembly 63h, a hot water and vapor reservoir 65h, a rotary diversion valve assembly 67h, and a concentrated solar energy assembly 48. This embodiment differs primarily from the preferred embodiment in that liquid is vaporized above the piston assembly 13h rather than below it. This difference eliminates the need for a transparent core portion in the piston assembly 13h. Except as noted hereinbelow, power plant 11h has parts parallel to those of power plant 11g and said parts are designated by corresponding numerals with the letter "h" appended thereto.

The fit between the internal diameter of cylinder 16h and ceramic plates 39h and 41h must be lose enough to prevent any water 47h above piston 13h from flowing into the space below it. The piston must be constructed so that it weighs less than 14.7 pounds per square inch of horizontal cross-sectional area, since atmospheric pressure will be utilized for raising the piston as described in detail below.

Adjacent the upper end wall 18h, located in cylinder wall 16h is an inlet/outlet port 66h having a rotary diversion valve assembly 67h mounted therein. Since rotary diversion valve assembly 67h is of a structure identical to the rotary diversion valve assembly 67g utilized in the first alternate embodiment, FIGS. 4, 5 and 6 and parallel elements therein designated by numerals having either the letter "g" or no letter appended thereto will be referred to as though the letter "h" was instead so appended. Also located in cylinder wall 16h adjacent the upper end wall 18h is an outlet port 106 which is connected by a tube 107 to a gate valve 108 which is exposed to atmospheric pressure.

Adjacent the lower end wall 17g, located in cylinder wall 16h is inlet port 20h. Inlet port 20h is connected by a tube 21h to a one-way atmospheric valve 22h which allows air to flow into the lower section of cylinder 12h whenever the pressure therein is below atmospheric pressure. Whenever the in-flow of air through one-way atmospheric valve 22h stops, it is closed by the effect of gravity.

Also located in cylinder wall 16h adjacent to lower end wall 17h is a second inlet port 25h which is connected by tube 26h to first end 20h of air reservoir 14h. A gate valve 109 is located in tubing 26h adjacent to inlet port 25h which is opened as required to maintain air pressure below piston means 13h to keep it at a starting position 44h.

An outlet port 24h is located in cylinder wall 16h a short distance above lower end wall 17h, inlet port 21h and inlet port 25h. Outlet port 24h has a spring-biased valve 27h mounted therein which connects outlet port 24h to tube 26h at a point between first end 20h of air reservoir 14h and gate valve 109. Also, air reservoir 14h has a take-off tube 42h with check valve 43h mounted therein. As in the first alternate embodiment, air reservoir 14h may be utilized as a supplementary source of stored energy by tapping compressed air through tube 42h.

Compressed air supply 33h supplies cylinder assembly 12h with a quantity of pressurized air which supports piston assembly 13h at or above starting position 44h. A supply of dark colored water 47h is located atop piston assembly 13h as well as being contained in water reservoir 65h.

At the beginning of the process of converting energy with power plant 11h, piston assembly 13h is held at or above starting position 44h by compressed air beneath it. A cycle of the process is initiated by first vaporizing a portion of the dark colored liquid atop piston assembly 13h and then venting excess water vapor above piston assembly 13h to the atmosphere by opening gate valve 108. Gate valve 108 is closed before any air enters therethrough into cylinder assembly 12h. Valve assembly 67h is then moved from second position 99h (see FIG. 5) which allows no flow, to third position 100h (see FIG. 6) which connects the space above piston assembly 13h to steam condensing assembly 63h. The water vapor above the piston assembly 13h will then flow out as it is condensed, thereby creating a relative vacuum above piston assembly 13h. The pressure below piston assembly 13h is not allowed to fall below atmospheric by one-way valve 23h. The resulting pressure difference will cause piston assembly 13h to rise. Valve assembly 67h is changed to second position 99h at the appropriate moment for causing piston assembly 13h to stop at an apex position 46h, which is a short distance below inlet/outlet port 66h. The space within cylinder assembly 12h below piston assembly 13h is at this point occupied by air at atmospheric pressure that has been admitted by one-way valve 22h.

Before a piston lowering step occurs, valve assembly 67h is changed to first position 98h (see FIG. 4) in order to replenish the amount of water 47h above piston assembly 13h by allowing water to flow from water reservoir 65h through valve assembly 67h into the space above piston assembly 13h. When the required amount of water 47h is inside cylinder assembly 12h above piston assembly 13h, valve assembly 67h is then moved back to position 99h which allows no flow.

The step of lowering piston assembly 13h is affected by vaporizing water 47h above piston assembly 13h by directing a concentrated beam of solar energy upon it. The resulting increase in pressure above piston assembly 13h forces it downwards, compressing the column of air below it. When the air below piston assembly 13*h* exceeds the pressure inside air reservoir 14*h*, spring-biased valve 24*h* opens, allowing the air to flow through outlet port 24*h* and tube 26*h* into air reservoir 14*h*, creating a supply of compressed air therein. This flow of air into air reservoir 14*h* is stopped when piston assembly 13*h* reaches starting position 44*h* where piston assembly 13*h* blocks outlet port 23*h* and the compressive support of the air below piston assembly 13*h* halts the downward movement of piston assembly 13*h*. At this point the concentrated solar energy is directed away from power plant 11*h* and the steam above piston assembly 13*h* is vented to the atmosphere as described above in preparation for another cycle.

In the case where a single power plant complex is synchronized with one or more others, movable reflector 53*h* of solar energy means 48*h* directs concentrated solar energy to another stationary reflector 54*h* of another complex after piston assembly 13*h* reaches starting position 44*h* at the end of the lowering step. Otherwise, the position of movable reflector 53*h* of solar energy assembly 48*h* would be shifted at appropriate points in time so as to discontinue any unneeded vaporization of water for the purpose of lowering piston means 13*h* to starting position 44*h*.

When the power plant is not in use, the compressed air in air reservoir 14*g* can be utilized in addition to compressed air supply 33*h* to prevent piston assembly 13*h* from settling down onto lower end wall 17*h* by opening gate valve 109 as required.

DESCRIPTION OF THE THIRD ALTERNATE EMBODIMENT

Figure 3:
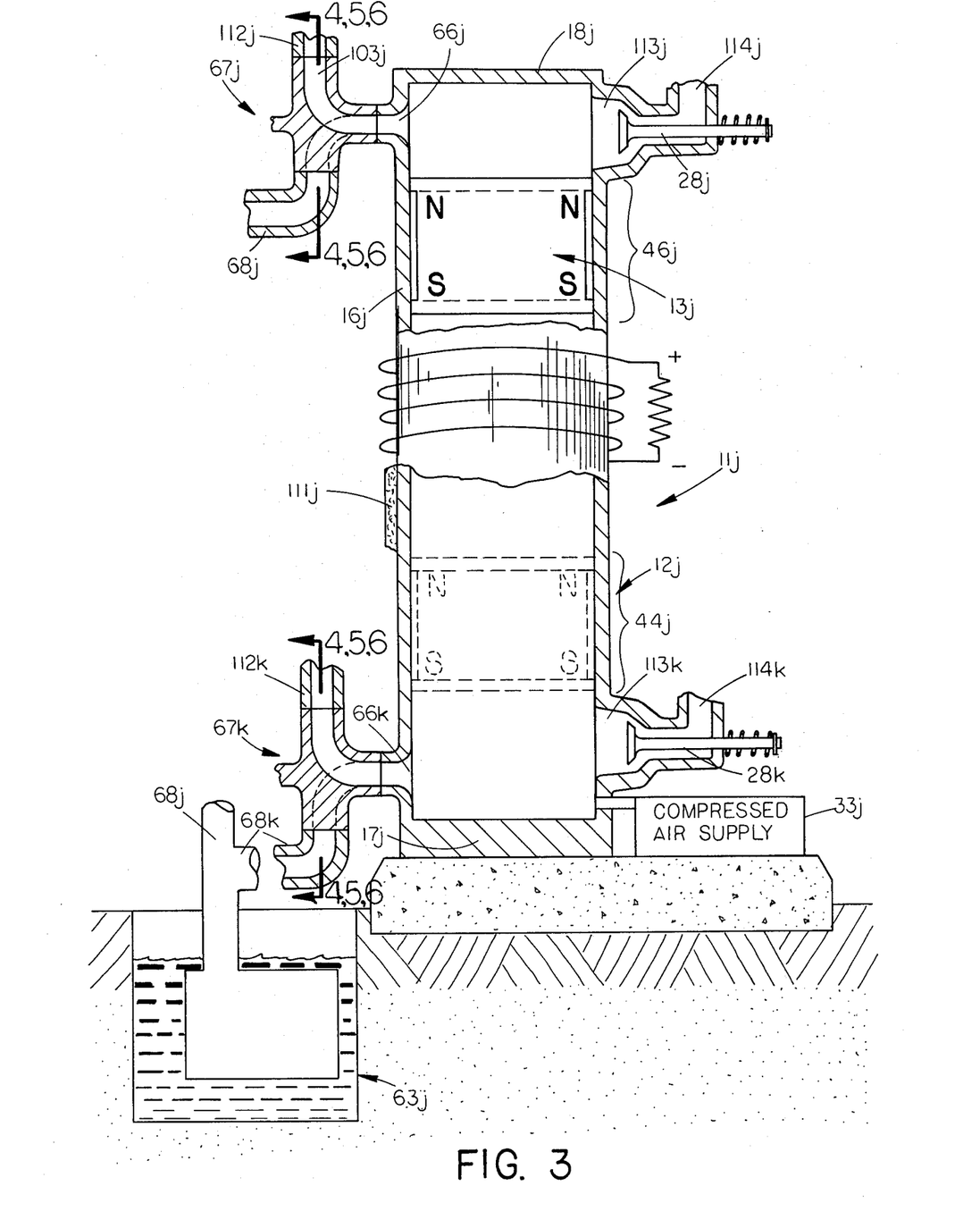
FIG. 3 is a diagramatic, fragmented, cross-sectional side view of the third alternate embodiment wherein a structure for utilizing the condensation of steam is shown.

Referring now to FIG. 3, another alternate embodiment of the power plant is depicted generally as 11*j* and includes a cylinder assembly 12*j*, a piston assembly 13*j*, a steam condensing assembly 63*j*, and two rotary diversion valve assemblies 67*j* and 67*k*. This embodiment differs primarily from the first alternate embodiment in that the pressure difference for raising and lowering piston assembly 13*j* is maintained in part from a source of low pressure steam exterior to the power plant 11*j*. This difference eliminates the need for a liquid within cylinder 12*j* that is vaporized by an exterior source of energy. Except as noted hereinbelow, power plant 11*j* has parts parallel to those of power plant 11*g* and said parts are designated by corresponding numerals with the letter "j" appended thereto.

At present, vast amounts of low pressure steam from geothermal or other sources are not being utilized because there has been no economical way devised to utilize such steam. If such steam is at atmospheric pressure, 14.5 PSI, it is simply allowed to escape. However, if it is contained within a cylinder and allowed to condense on one side of a piston, given enough piston area, considerable power can be converted from it. This embodiment discloses a way of utilizing such a source of energy.

If the low pressure steam comes from geothermal sources it may contain chemicals which form scale and plug pipes and valves. Also, it might contain inert gases, such as carbon dioxide or hydrogen sulfide which, since they would not condense, would quickly fill the separate condenser, thus rendering it useless for creating a vacuum. In such instances, a thermostatically controlled heat exchanger (not shown) would be employed, in order that only steam generated from pure water would enter the device.

The entire cylinder assembly 12*j* is covered by insulation 81*j* in order to prevent the condensation of low temperature steam that may be used by power plant 11*j*. Piston assembly 13*j* is designed for minimum weight in order to minimize mechanical wear and to minimize the effort required to lift it by low pressure steam.

Adjacent the upper end wall 18*j*, located in cylinder wall 16*j*, is an outlet port 66*j* which has first rotary diversion valve assembly 67*j* mounted therein. Since rotary diversion valve assembly 67*j* is of a structure identical to the rotary diversion valve assembly 67*g* utilized in the first alternate embodiment, FIGS. 4, 5 and 6 and parallel elements designated by numerals having either the letter "g" or no letter appended thereto, will be referred to as though the letter "j" was instead so appended. However, port 103*j* of rotary diversion valve assembly 67*j* is connected to tubing 112 which is vented to atmosphere rather than port 103*j* being connected to separate vapor reservoir 65*g* as in the first alternate embodiment. Also located in cylinder wall 16*j* adjacent to upper end wall 18*j*, is an inlet port 113 with spring biased inlet valve 28*j*. Tubing 114 connects inlet port 113 to a heat exchanger or other source of steam which may be either industrial waste steam or geothermal steam, for example. A corresponding set of ports and valves are located in cylinder wall 16*j* adjacent to lower end wall 17*j* which are designated by the appended letter "k".

At the beginning of the process of converting energy with power plant 11*j*, piston assembly 13*j* is held at or above starting position 44*j* by steam pressure supplied through port 113*k*. A cycle of the process is initiated by first venting excess steam pressure above piston assembly 13*j* to the atmosphere by moving upper valve assembly 67*j* to first position 98*j* (see FIG. 4) which connects the interior of cylinder assembly 12*j* above piston 13*j* to the atmosphere through tubing 112. Rotary diversion valve 67*j* is then moved to third position 100*j* (see FIG. 6) which connects the space above piston assembly 13*j* to steam condensing assembly 63*j* through tube 68*j*. Valve 28*k* is then opened allowing steam to flow into the space below piston assembly 13*j*. The resulting pressure difference created by the steam below piston assembly 13*j* and the relative vacuum above piston 13*j* then causes it to rise towards the top of power plant 11*j*. Shortly before piston assembly 13*j* reaches the top, valve assembly 67*j* is moved to position 99*j* (see FIG. 5), allowing no flow therethrough, and valve 28*j* is opened long enough to allow a sufficient quantity of steam into the space above piston assembly 13*j* to serve as a bounce chamber medium. Thus, mechanical contact between piston assembly 13*j* and upper end wall 18*j* is prevented. This quantity of steam will cause piston assembly 13*j* to halt at an apex position 46*j*. Also, at the moment valve 28*j* is opened, valve 28*k* is closed, since steam is no longer required to lift piston assembly 13*j*.

The step of lowering piston assembly 13*j* is effected by first venting the steam below piston assembly 13*j* to the atmosphere by moving lower rotary valve assembly 67*k* to first position 98*k* (see FIG. 4) which connects the interior of cylinder assembly 12*j* below piston assembly 13*j* to the atmosphere through tubing 112*k*. Rotary valve assembly 67*k* is then moved to third position 100*k* (see FIG. 6) which connects the space below piston assembly 13*j* to steam condensing assembly 63*j* through tube 68*k*. Valve 28*j* is then opened allowing steam to flow into the space above piston assembly 13*j*. The resulting pressure difference created by the steam above piston assembly 13j and the relative vacuum below piston assembly 13j, combined with the weight of piston assembly 13j, causes it to fall towards the bottom of power plant 11j. Shortly before piston assembly 13j reaches the bottom, valve assembly 67k is moved to position 99k (see FIG. 5), allowing no flow therethrough and valve 28k is opened long enough to allow a sufficient quantity of steam into the space below piston assembly 13j to serve as a bounce chamber medium. Thus, mechanical contact between piston assembly 13j and lower end wall 17j is prevented. This quantity of steam also serves to hold piston assembly 13j in starting position 44j in order that another cycle might be initiated as described above. Also, at the moment valve 28k is opened, valve 28j is closed, since steam is no longer required to lower piston assembly 13j.

When power plant 11j is not in use, compressed air supply 33j could be utilized in lieu of steam pressure to prevent piston assembly 13j from settling down onto lower end wall 17j by maintaining a sufficient amount of pressure beneath piston assembly 13j to hold it at starting position 44j. Any compressed air so utilized could be purged from cylinder assembly 12j by moving rotary diversion valve 67k to first position 98k (see FIG. 4) and opening valve 28k for a suitable period. Also, it should be noted that whenever rotary valve assemblies 67j or 67k are utilized for allowing steam to escape to the atmosphere, they must be reclosed before any air is allowed to enter cylinder assembly 12j, as the presence of air would interfere with the performance of steam condensing assembly 63j.

By using a piston assembly of sufficiently low weight, this third alternate embodiment could be modified by orienting the cylinder assembly horizontally rather than vertically. Also, it might be feasible to utilize the steam exhausted to atmosphere by this embodiment in other similar power plants to create more electric power. In order to limit the deposit of mineral inpurities typically found in geothermal steam, it may be desirable to introduce a heat exchanger to produce steam from pure water.

Obviously, numerous modifications and variations of the present invention are possible in light of the above teachings. It is therefore to be understood that within the scope of the appended claims, the invention may be practised otherwise than as specifically described therein.

I claim:

1. A process for converting gas expanding energy sources into useful other forms of energy, such as inducing an alternating current in a coil, comprising the steps of:
    holding a piston means forming a magnetic field and slidably operable, but otherwise unattached, within a substantially enclosed cylinder means at a starting position near a lower end thereof, by the compressive support of the vapor of a liquid in the bottom of the cylinder means, said cylinder means having a load-connected electrical conductor coil means surrounding it intermediate its ends;
    lifting said piston means to an apex position near the upper end of said cylinder means by vaporizing the liquid by directing a concentrated solar beam onto it, thereby opening a spring-biased valve mounted in an outlet port in the upper end of said cylinder means in order to transfer the column of air above the piston means through a tube into a reservoir means;
    lowering said piston means to said starting position, including the steps of:
    discontinuing the directing of the concentrated solar beam, thereby allowing the vapor to condense and leave a vacuum below the piston means, and allowing said spring-biased valve in the outlet port to close and a spring-biased valve in an inlet port in the upper end to open in order to admit a charge of fresh air;
    allowing a portion of the vapor to escape from beneath the piston means in the cylinder means to a separate hot reservoir partially filled with said liquid by a valve means for diverting the vapor when the piston means reaches the apex position;
    allowing any remaining liquid or liquid vapor to escape from beneath the piston means in the cylinder means to a remote cooling condenser containing a near perfect vacuum by the vapor diverting valve means before the piston means reaches a mid-point between the apex position and the starting position;
    preventing the escape of the vapor beneath the piston into the remote cooling condenser by the vapor diverting valve means; and
    allowing a portion of the vapor and liquid stored in the separate hot reservoir to return therefrom to the cylinder means beneath the piston means by the vapor diverting valve means before the piston means reaches the starting position, whereby a bounce chamber for the falling piston is provided and the liquid in the cylinder means is replenished; and
    stopping the downward movement of said piston means at said starting position by compressed gas below said piston means, thereby completing a cycle which can be repeated by starting at the step in which the piston is lifted.

2. The process as defined in claim 1 further comprising the step of:
    increasing the vapor pressure beneath the piston means after a portion of the liquid vapor has returned to the cylinder means from the separate reservoir and before the piston means has returned to its starting position by directing a concentrated solar beam onto the liquid vapor and liquid beneath the piston means.

3. The processes defined in claim 1 further comprising the step of:
    replacing said liquid in the separate reservoir which will be returned to the cylinder means by pumping condensed liquid from the cooling condenser is said separate reservoir.

4. The process as defined in claim 3 further comprising the step of:
    keeping the liquid being pumped from the cooling condenser to the separate reservoir hot whereby the pressure therein will not be materially lowered.

5. A device for converting gas expanding and contracting energy sources into useful other forms of energy, such as inducing an alternating current in a coil, comprising:
    a liquid and its vapor located in the bottom of a cylinder means to support in a starting position near a lower end of the cylinder means a piston means forming a magnetic field, said cylinder means also having an upper end and a load-connected electrical conductor coil surrounding it intermediate said ends thereof;

a transparent core in said upper cylinder end and another in said piston means for permitting a concentrated solar beam to be intermittently directed on said liquid in order to vaporize said liquid for lifting the piston means to an apex position near the upper end of said cylinder means and after condensing, causing said piston means to return to said starting position to complete a cycle;

a first spring-biased valve mounted in a first outlet port in the upper end of the cylinder means for allowing the column of air above the piston means to be forced through a connecting tube into a compressed air reservoir means;

a spring-biased valve mounted in an inlet port in the upper end of the cylinder means to allow the piston means to pull a fresh column of air in above it as it falls to its starting position;

concentrated solar beam directing means;

a separate hot vapor reservoir partially filled with said hot liquid connected by a first tube to a second outlet port located in said cylinder means beneath the starting position;

a cooling condenser containing a near perfect vacuum connected by a second tube to said second outlet port in said cylinder means and by a third tube to said separate hot vapor reservoir;

a valve means mounted in said second outlet port for diverting liquid vapor and liquid between the cylinder means and the separate hot vapor reservoir and from the cylinder means to the remote cooling condenser and for sealing off the cylinder means from both the separate hot vapor reservoir and the cooling condenser;

means for pumping condensed hot liquid from the cooling condenser through the third tube to the separate vapor reservoir and means for sequentially timing the directing and discontinuing directing of the concentrated solar beam onto the liquid.

6. The device as defined in claim 5 further comprising:

means for heating the condensed liquid as it is pumped from the cooling condenser to the separate vapor reservoir.

7. The device as defined in claim 5 wherein the liquid vapor and liquid diverting valve means is a rotary valve having a first position connecting said second outlet port to said hot vapor reservoir, a second position closing said second outlet port whereby both the entrance of vapor into and escape of vapor from the cylinder is prevented, and a third position connecting said second outlet port to said remote cooling condenser.

8. The device as defined in claim 7 wherein said liquid vapor and liquid diverting valve means is operated by pneumatic pressure.

9. The device as defined in claim 8 wherein said compressed air reservoir means supplies the pneumatic pressure.

10. A device for converting gas expanding and contracting energy sources into useful other forms of energy, such as inducting an alternating current in a coil, comprising:

means for holding a piston means forming a magnetic field at a starting position near a lower end of the cylinder means also having an upper end, with a load-connected electrical induction coil surrounding it intermediate the ends thereof;

valve means connected to an inlet-outlet port in the upper end of the cylinder means, for diverting liquid and vapor from the upper end of the cylinder means to a remote cooling condenser for reducing the pressure above the piston means or to a makeup liquid reservoir;

a first one-way valve mounted in a first inlet port in the lower end of the cylinder means for allowing air into the cylinder means when the pressure therein falls below atmospheric pressure facilitating the lifting of the piston means when there is a near perfect vacuum above it;

a transparent core in said upper cylinder end for permitting a concentrated solar beam to be intermittently directed on a liquid located within the cylinder means above the piston means in order to vaporize said liquid for lowering the piston means to the starting position;

a second one-way valve means mounted in a first outlet port in the lower end of the cylinder means for allowing the column of air below the piston means to be forced through a tube into a compressed air reservoir means;

concentrated solar beam directing means; and means for sequentially timing the directing and discontinuing directing of the concentrated solar beam onto the liquid.

11. The device as defined in claim 10 further including a second said device as defined in claim 10 for intermittent operation by directing the concentrated solar beam on the liquid in the top of the second device so that the two-cycle phases of the two devices are one-half phase out of step with each other.

12. The devices as defined in claims 10 or 11 wherein the liquid is dark colored.

13. The device as defined in claim 10 further comprising:

a gate valve means connected to a second outlet port in the upper end of the cylinder means for allowing excess vapor to be vented to the atmosphere.

14. The device as defined in claim 10 wherein the liquid vapor diverting valve means is a rotary valve having a first position connecting said first outlet port to the makeup liquid reservoir a second position closing said first outlet port whereby all flow through said first outlet is prevented, and a third position connecting said first outlet port to said remote cooling condenser.

15. The device as defined in claim 14 wherein said liquid vapor diverting valve means is operated by pneumatic pressure.

16. The device as defined in claim 15 wherein said compressed air reservoir means supplies the pneumatic pressure.

17. The device as defined in claim 10 wherein said holding means includes the compressed air reservoir means and a separate air compressor.

18. A process for converting gas expanding energy sources into useful other forms of energy, such as inducing an alternating current in a coil, comprising the steps of:

holding a piston means forming a magnetic field and slidably operable, but otherwise unattached, within a substantially enclosed cylinder means at a starting position near a lower end thereof, by compressed air below said piston means, said cylinder means having a load-connected electrical conductor coil means surrounding it intermediate its ends;

lifting said piston means to an apex position near the upper end of said cylinder means by evacuating the space within the cylinder means above the piston means while maintaining the air pressure within the cylinder means below the piston means to at least atmospheric, thereby opening a spring-biased value mounted in an outlet port in the upper end of said cylinder means in order to transfer the column of water vapor above the piston means through a tube into a reservoir means;

lowering said piston means to said starting position for completion of the cycle by vaporizing a quantity of liquid within the cylinder means above the piston means by directing a concentrated solar beam onto it whereby the increased pressure above the piston means forces it downward, thereby allowing the spring-biased valve in the outlet port to close and opening a spring-biased valve in an inlet port in the upper end of said cylinder means in order to admit a charge of water vapor; and stopping the downward movement of said piston means at said starting position by compressed gas below said piston means, thereby completing a cycle which can be repeated by starting at the step in which the piston is lifted.

19. The process as defined in claim 18 wherein a second said process as defined in claim 18 is sustained by directing the concentrated solar beam onto a second quantity of liquid located within a second cylinder means above a second piston means, at an apex position, at the moment the directing of the beam on the first quantity of liquid is discontinued and then redirecting the beam onto the first quantity of liquid at the moment the directing of the beam on the second quantity of liquid is discontinued.

20. The process as defined in claims 18 or 19 wherein the quantities of liquid are dark colored.

21. The process as defined in claims 18 or 19 wherein the timing of the directing, discontinuing, and redirecting of the concentrated solar beam is carried out with electronic timing means and a movable flat mirror.

22. The process as defined in claim 18 wherein the step of lowering said piston means to the starting position further comprises the step of allowing the air below the piston to escape only into a compressed air reservoir when the air pressure below the piston increases to a level greater than that in the reservoir due to the lowering of the piston.

23. The process as defined in claim 22 wherein the step of lifting said piston means to the apex position comprises the steps of:

first allowing the liquid vapor above the piston means in the cylinder means to escape to the atmosphere by a valve means for diverting the vapor, thereby lowering the pressure there to atmospheric pressure and allowing the compressed air in the chamber below the piston means starting position to lift the piston means;

next allowing the remaining liquid vapor above the piston means in the cylinder means to escape to a remote cooling condenser containing a near perfect vacuum by the vapor diverting means thereby increasing the pressure difference across the piston means in order to assist in lifting the piston means;

meanwhile maintaining the air pressure below the piston means to at least atmospheric pressure by a one-way valve means which allows atmospheric air to flow into the lower part of the cylinder means whenever the pressure there drops below atmospheric;

stopping the flow to the remote cooling condenser when the piston means reaches the apex position a short distance from the top of the cylinder means; and then replenishing the liquid consumed by vaporization from a reservoir of liquid by the vapor diverting valve and connected thereto, thereby preparing for the step of lowering the piston means.

24. The process as defined in claim 23 wherein the step of holding the piston means at the starting position is further characterized as utilizing the pressurized air within the compressed air reservoir and supplementing the pressure within the compressed air reservoir by a separate air compressor.

25. A process for converting gas expanding energy sources into useful other forms of energy, such as inducing an alternating current in a coil, comprising the steps of:

holding a piston means forming a magnetic field and slidably operable, but otherwise unattached, within a substantially enclosed cylinder means at a starting position near a lower end thereof, by compressed gas below said piston means, said cylinder means having a load-connected electrical conductor coil means surrounding it intermediate its ends;

lifting said piston means to an apex position near the upper end of said cylinder means by evacuating the space within the cylinder means above the piston means while allowing steam to flow into the cylinder means below the piston means, thereby opening a spring-biased valve mounted in an outlet port in the upper end of said cyliinder means in order to transfer the column of steam above the piston means through a tube into a reservoir means;

lowering said piston means to said starting position for completion of the cycle of evacuating the space within the cylinder means below the piston means while allowing steam to flow into the cylinder means above the piston means, thereby allowing the spring-biased valve in the outlet port to close and opening a spring-biased valve in an inlet port in the upper end of said cylinder means in order to admit a charge of water vapor; and stopping the downward movement of said piston means at said starting position by compressed gas below said piston means, thereby completing a cycle which can be repeated by starting at the step in which the piston is lifted.

26. The process as defined in claim 25 wherein the step of lifting said piston means to the apex position further comprises the steps of:

first allowing the steam above the piston means within the cylinder means to escape to the atmosphere by a first valve means for diverting the steam, thereby lowering the pressure there to atmospheric;

next allowing the remaining steam above the piston means within the cylinder means to escape to a remote steam condenser containing a near perfect vacuum by the first valve diverting means;

meanwhile allowing steam to flow into the cylinder means below the piston means by opening a first spring-biased valve;

stopping the flow to the remote steam condenser when the piston means is a short distance from the apex position;

allowing a quantity of steam to flow into the cylinder means above the piston means by briefly opening a second spring-biased valve, thereby stopping the piston means at the apex position; and stopping the flow of steam into the cylinder means below the piston means by closing the first spring-biased valve.

27. The process as defined in claim 25 or 26 wherein the step of lowering said piston means to the starting position comprises the steps of:

first allowing the steam below the piston means in the cylinder means to escape to the atmosphere by a second valve means for diverting the steam, thereby lowering the pressure there to atmospheric;

next allowing the remaining steam below the piston means in the cylinder means to escape to a remote steam condenser containing a near perfect vacuum by the second steam diverting means;

meanwhile allowing steam to flow into the cylinder means above the piston means by opening the second spring-biased valve;

stopping the flow to the remote steam condenser when the piston means is a short distance from the starting position;

allowing a quantity of steam to flow into the cylinder means below the piston means by briefly opening the first spring biased valve, thereby stopping the piston means at the starting position; and stopping the flow of steam into the cylinder means above the piston means by closing the second spring-biased valve means.

28. The process as defined in claim 27 further comprising the step of utilizing an air or steam compressor means connected to the cylinder means below the starting position for maintaining the piston means at the starting position.

29. A device for converting gas expanding and contracting energy sources into useful other forms of energy such as inducting an alternating current in a coil, comprising:

means for holding a piston means forming a magnetic field at a starting position near a lower end of the cylinder means also having an upper end, with a load connected electrical induction coil surrounding it intermediate said ends thereof;

a remote steam condenser containing a near perfect vacuum;

a first valve means connected to a first outlet port in the upper end of the cylinder means for diverting steam from the upper end of the cylinder means to the remote steam condenser or to the atmosphere;

a second valve means connected to a second outlet port in the lower end of the cylinder means for diverting steam from the lower end of the cylinder means to the remote steam condenser or to the atmosphere;

a first spring-biased valve means mounted in a first inlet port in the lower end of the cylinder means for allowing steam to enter the lower end of the cylinder means;

a second spring-biased valve means mounted in a second inlet port in the upper end of the cylinder means for allowing steam to flow into the upper end of the cylinder means; and means for sequentially timing the operation of the above valve means.

30. The device as defined in claim 29 wherein the first and second steam diverting valve means are rotary valves having a first position connecting said first and second outlet ports to the atmosphere, a second position closing said first and second outlet ports whereby all flow through said ports is prevented, and a third position connecting said first and second outlet ports to said remote steam condenser.

31. The device as defined in claim 29 wherein said holding means is a compressed air or steam supply connected to a third inlet port located in the lower end of the cylinder means, whereby the piston means can be maintained at the starting position whenever the power plant is not in use.

* * * * *